United States Patent [19]

Cser

[11] 4,300,488
[45] Nov. 17, 1981

[54] RESONATOR CONDUIT SYSTEM FOR INTRODUCING INTAKE GASES IN INTERNAL COMBUSTION ENGINES

[75] Inventor: Gyula Cser, Budapest, Hungary

[73] Assignee: Autoipari Kutato Intezet, Budapest, Hungary

[21] Appl. No.: 55,486

[22] Filed: Jul. 6, 1979

[30] Foreign Application Priority Data

Jul. 7, 1978 [HU] Hungary ................................ AU-406

[51] Int. Cl.³ ............................................. F02B 27/00
[52] U.S. Cl. .............................. 123/52 M; 123/52 MB
[58] Field of Search ............. 123/52 M, 52 MB, 59 R

[56] References Cited

U.S. PATENT DOCUMENTS

| 2,740,389 | 4/1956 | Reyl | 123/52 M |
| 3,015,322 | 1/1962 | Rohm | 123/52 M |
| 3,796,048 | 3/1974 | Annus et al. | 123/52 M |
| 3,990,415 | 11/1976 | Malphettes | 123/52 MB |
| 4,064,696 | 12/1977 | Cser | 123/52 M |
| 4,183,332 | 1/1980 | Hofbaüer et al. | 123/59 R |

FOREIGN PATENT DOCUMENTS

| 1048083 | 12/1958 | Fed. Rep. of Germany . |
| 1935155 | 2/1970 | Fed. Rep. of Germany . |
| 161323 | 6/1973 | Hungary . |
| 866660 | 4/1961 | United Kingdom . |
| 1015417 | 12/1965 | United Kingdom . |

Primary Examiner—Charles J. Myhre
Assistant Examiner—Andrew M. Dolinar
Attorney, Agent, or Firm—Spencer & Kaye

[57] ABSTRACT

A multi-space intake gas conduit system for a multi-cylinder internal combustion piston engine has at least two separate resonator vessels each associated with a separate cylinder group formed of predetermined cylinders of the engine. Each resonator vessel is coupled to intake openings of the cylinders forming the cylinder group associated with the respective resonator vessel. To each resonator vessel there is coupled a resonance tube and there is further provided a damper vessel interconnecting the resonance tubes. The resonator vessels and resonance tubes associated with separate cylinder groups form separate acoustic oscillating systems tuned to substantially the same natural frequencies. The resonance tubes coupled to different resonator vessels are of different lengths; the length of the shortest resonance tube is at least 0.6 times the length of the longest resonance tube and the diameter of a circle having an area identical to the cross-sectional area of the shortest resonance tube is at least 0.8 times the diameter of a circle having an area identical to the cross-sectional area of the longest resonance tube. Further, the volume of the resonator vessel coupled to the shortest resonance tube is at the most 1.7 times the volume of the resonator vessel coupled to the longest resonance tube.

11 Claims, 3 Drawing Figures

RESONATOR CONDUIT SYSTEM FOR INTRODUCING INTAKE GASES IN INTERNAL COMBUSTION ENGINES

BACKGROUND OF THE INVENTION

This invention relates to a multi-space resonator conduit system for introducing intake gases into piston-type internal combustion engines. The conduit system is coupled to the intake openings of the engine cylinders.

The specific output or torque of piston-type internal combustion engines basically depends from the quantity of the intake gas drawn into the cylinders of the engine within one cycle. For this reason there are widely used methods and systems by means of which the quantity of the intake gas introduced into the cylinders can be increased. Such systems include various charging arrangements which, with the utilization of an external energy source or the energy derived from the exhaust gases increase the charging of the cylinders with intake gas. The known methods include processes such as the intake (suction) pipe charging which, for charging the cylinders, utilizes the non-steady flow generated by the periodic suction effect of the cylinders and the accompanying phenomena, that is, the pressure oscillations in the intake system.

The pressure oscillations caused by the non-steady intake gas flow may be particularly advantageously utilized in multi-space resonator conduit systems for the intake gas. In such systems at most four of those engine cylinders whose intake periods do not significantly overlap, are connected to the same resonator vessel. At least one resonance tube is coupled to each resonator vessel. The resonance tubes may obtain the intake gas directly from the surrounding atmosphere, but in case an air filter or, in particular, a charging arrangement is used, the resonance tubes are interconnected by a damping vessel which communicates with the air filter or the charging arrangement. Such a resonator conduit system for the intake gas is disclosed, for example, in Hungarian Patent No. 161,323 and German Patent No. 1,935,155.

In an intake gas conduit system of the above type, for example, in case of a four-cycle six-cylinder in-line engine—considering the usual ignition sequence of 1-5-3-6-2-4—the intake openings of a first cylinder group formed by the first, second and third cylinders are coupled to a first resonator vessel, while the intake openings of a second cylinder group formed by the fourth, fifth and sixth cylinders are coupled to a second resonator vessel. Thus, such an engine has two resonator vessels and at least two resonance tubes. The acoustic oscillating system formed of each resonator vessel and its resonance tube(s) has a natural frequency well defined by the linear dimensions of the system and by the velocity of sound in the intake gas. In case the intake frequency of the cylinders connected to the resonator vessel is identical to the natural frequency of the system, a resonance will appear in the acoustic oscillating system. The maximum charging effect is obtained in the range of that rpm where such a resonance condition is established. Such an rpm is referred to as the resonance rpm. It is apparent that by changing the natural frequency of the system, the resonance rpm may be adapted to a desired engine rpm. The charging effect—as it is disclosed, for example, in U.S. Pat. No. 3,796,048—may be advantageously increased in a wide rpm range by the appropriate selection of the dimensions of the system.

For a smooth running and a satisfactory operation of the engine, it is, however, indispensable that the intake gas supply to the cylinders of the individual cylinder groups be identical. In order to meet this requirement, the individual cylinder groups have a suction system that provides for identical charging effects. Thus, in case of resonance charging, they have resonator vessels and resonance tubes of identical dimensions and in case of suction pipe charging, the individual cylinders or cylinder groups have suction pipes of identical dimensions.

Difficulties have been encountered, however, in arranging the identically dimensioned suction pipes or, in case of resonator systems, the resonator vessels and resonance tubes in the space available at the engine. For overcoming these difficulties several solutions are known, such as disclosed, for example, in British Patent Nos. 866,660 and 1,015,417 as well as German Patent No. 1,048,083 for suction pipe chargers and, as disclosed in U.S. Pat. No. 4,064,696 for multi-space intake gas resonator systems.

Although the systems in the above-identified prior art and solutions similar thereto resolve positional problems in specific and particular cases, it is their common characteristic that the desired identity of the charging effect regarding the different cylinders is achieved by elements of identical dimensions. This means that these solutions have structural limitations in that they can be utilized only in certain predetermined engine arrangements and mounting conditions. In a large number of engine constructions or mounting modes, the known solutions cannot be resorted to, precisely because they call for fixed spatial requirements or arrangements.

SUMMARY OF THE INVENTION

It is an object of the invention to provide an improved multi-space intake gas conduit system which eliminates the above-discussed difficulties encountered in the mounting and positioning of resonator vessels and resonance tubes having identical and predetermined dimensions for each cylinder group. The invention provides for an expansion of the possibilities of practical application while, at the same time, ensures an identical charging of the cylinders.

The invention is founded on the recognition that gas oscillations which are of identical course for each cylinder group and which ensure the identical charging of the individual engine cylinders can be generated even if the resonance tubes are of unlike lengths, provided the intake gas conduit system is appropriately designed and certain conditions are met. The resonance tube length which is arbitrarily selectable within given limits provides for the possibility that the damping vessel may be arranged with a greater freedom with respect to the individual resonator vessels, that is, the distances of the damping vessel from the resonator vessels may be different. Thus, in the design of the resonator vessels, the damping vessel and the resonance tubes, the heretofore required geometrical symmetry need no longer be maintained. Thus, this requirement which has constituted one of the greatest hindrances in the structural positioning of the system can be eliminated and, in each instance, the space available for mounting may be utilized without any limitation.

The invention is an improvement in a multi-space intake gas conduit system which is coupled to the intake openings of cylinders in a multi-cylinder internal combustion engine of the piston type. The multi-space conduit system has at least two separate resonator vessels coupled to predetermined cylinder groups. Further, to each resonator vessel there is attached at least one resonance tube. The system further has at least one damper vessel which interconnects the resonance tubes. The resonator vessel coupled to the intake openings of the cylinders of one cylinder group and the resonance tube or tubes coupled to that resonator vessel constitute an acoustic oscillating system.

The earlier-stated objects and others to become apparent as the specification progresses, are accomplished by the invention, according to which, briefly stated, the resonance tubes of the acoustic oscillating systems are tuned in essence to identical natural frequencies, belong, according to their lengths, to at least two significantly different size groups; the length of the shortest resonance tube is at least 0.6 times the length of the longest resonance tube and further, the diameter of a circle whose area is identical to the cross-sectional area of the shortest resonance tube is at least 0.8 times the diameter of a circle whose area is identical to the cross-sectional area of the longest resonance tube. The term "significantly" is intended to mean other than normal manufacturing tolerances and is thus intended to designate such a length difference between the shortest and the longest resonance tube that has practical meaning within the context of the invention. Further, the volume of the resonator vessel coupled to the shortest resonance tube is at the most 1.7 times the volume of the resonator vessel associated with the longest resonance tube.

According to a further feature of the invention, the damper vessel is formed by a component having another primary function, such as an air filter.

In accordance with another advantageous feature of the invention, two resonator vessels or at least one resonator vessel and the damper vessel have a common wall.

In accordance with a further advantageous feature of the invention, the resonance tubes are at least in part arranged in at least one resonator vessel.

The length of the resonance tubes—as known—basically affects the generated gas oscillations. The length of the resonance tubes modifies, on the one hand, the natural frequency of the oscillating system and modifies, on the other hand, the mass of the oscillating gas column, resulting in an alteration of the kinetic energy—and thus the amplitudes—of the oscillations. In such a case, the gas oscillations which for the individual cylinder groups are thus of different natural frequencies, phase and amplitude, would result in unlike charging effects for the different cylinder groups.

In the intake gas conduit system according to the invention, however, the desired uniformity and symmetry of operation is ensured despite the different lengths of the resonance tubes by virtue of tuning the individual acoustic oscillating systems to at least approximately identical natural frequencies. This is expediently effected by modifying the volume of the resonator vessels as a function of the difference in the lengths of the resonance tubes. Further, by virtue of the appropriate selection of the cross sections of the resonance tubes, the amplitudes of oscillation are set at approximately the same value in all acoustic oscillating systems. This latter modification, however, cannot be effected in an otherwise plausible way, namely by re-establishing the identity of the oscillating masses (which identity has disappeared as a result of the different tube lengths), because such a modification would require a proportionately smaller cross section in case of a longer tube and a proportionately larger cross section in case of a shorter tube. This would mean that in case of oscillating masses of the same magnitude, the velocity of the oscillating gas column representing the mass and thus the kinetic energy of the oscillations would change which eventually again would result in an unequal magnitude of the amplitudes of the oscillations.

Because of the above reason, according to the invention the amplitudes and the kinetic energy of oscillations are set to at least approximately equal magnitudes, while the magnitude of the oscillating masses is maintained different. This is achieved by assigning a relatively small cross section to the relatively small resonance tube (that is, to the relatively small oscillating mass) and conversely. Although in this manner the magnitude of the oscillating mass is further reduced, the smaller cross section, however, results in a greater velocity which, in turn, generates a quadratically proportionate kinetic energy level. In this manner, despite the different magnitudes of the oscillating masses, the desired identity of the amplitudes of oscillations can be re-established. The difference between the tube cross sections is expediently selected as a function of the deviation in the tube lengths and more particularly proportionately thereto; the actual magnitudes are also dependent upon technological and manufacturing circumstances. The maximum possible deviation in the tube diameters, however, is limited by the fact that a reduction of the diameter below a predetermined limit results in such an increase in the flow velocity in the resonance tube of the smallest diameter that the flow losses will increase to an impermissible level and thus the amplitudes of oscillation cannot be further increased. The permissible maximum deviation of the tube lengths and the volumes of the resonator vessels involve similar considerations.

The invention, however, ensures the desired uniformity in the charging of the engine cylinders, by the provision of an intake gas conduit system in which the resonance tubes have—for obtaining a simple construction—different lengths within predetermined limits and wherein the above-explained relationships exist between the cross sections of the resonance tubes and the volumes of the resonator vessels. Many practical embodiments and tests have proven this result. At the same time, the possibility to select the length of the resonance tubes within given limits in an arbitrary manner provides a substantial freedom of design as compared to known solutions. The result is an expansion of the possibilities of practical applications.

DESCRIPTION OF THE PREFERRED EMBODIMENTS

Figure 1:
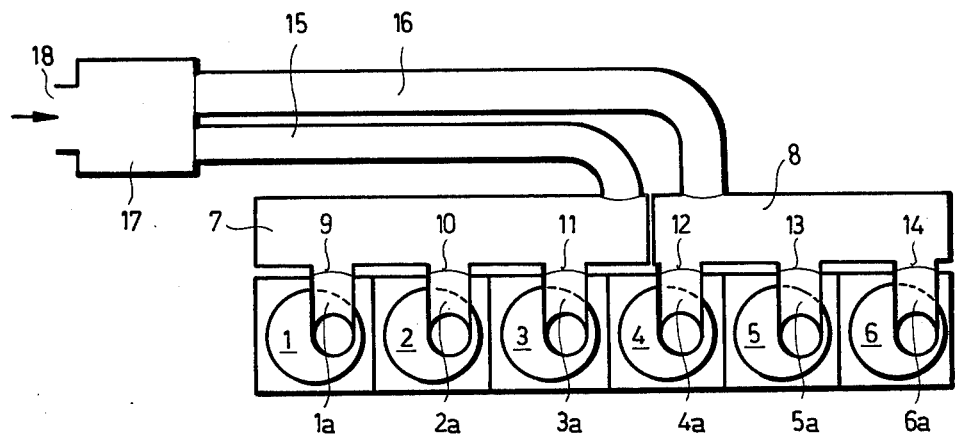
FIG. 1 is a schematic top plan view of a preferred embodiment of the invention associated with a six-cylinder in-line engine.

Turning now to FIG. 1, there are illustrated—in top plan view—cylinders 1-6 of a six-cylinder in-line engine. Cylinders 1, 2 and 3, on the one hand, and cylinders 4, 5 and 6, on the other hand, form two cylinder groups within which the intake cycles of the cylinders forming the respective group do not overlap. A first resonator vessel 7 is coupled by means of respective openings 9, 10 and 11 provided therein, to respective intake openings 1a, 2a and 3a of the cylinders 1, 2 and 3. A second resonator vessel 8 is coupled, by means of respective openings 12, 13 and 14 provided therein, to respective intake openings 4a, 5a and 6a of the cylinders 4, 5 and 6. Thus, the cylinders within the same cylinder group are associated with one and the same resonator vessel. From the resonator vessels 7 and 8 there extend respective resonance tubes 15 and 16 of circular cross section. The resonator vessel 7 and the resonance tube 15, on the one hand, and the resonator vessel 8 and the associated resonance tube 16, on the other hand, form two separate acoustic oscillating systems. At their end remote from the resonator vessels 7 and 8, the resonance tubes 15 and 16 are interconnected by means of a damping vessel 17 having an inlet opening 18 through which fresh intake gas enters into the conduit system from the ambient atmosphere or from other devices (such as an air filter or a charger) coupled to the intake gas conduit system. The damping vessel 17 is, with respect to the resonator vessels 7 and 8, positioned in any desired convenient spatial location; the distances from the damping vessel 17 to the resonator vessels 7 and 8 are different. This freedom permits an arrangement of the damping vessel 17 in the vicinity of the engine in the available free space as provided by the given structural and mounting conditions. Thus, it is to be understood that the particular positional relationships illustrated in FIG. 1 are exemplary only.

Because of the above-noted, not predetermined positioning of the damping vessel 17, its coupling with the resonator vessels 7 and 8 by means of resonance tubes having identical lengths could be effected only in a complex manner and with substantial spatial requirements. By using, however, resonance tubes 15 and 16 which have different lengths, the free space available around the engie can be taken into consideration in a large measure, and thus it is the most favorable positioning which will determine the actual length of the resonance tubes. There is imposed, however, the limitation that the shorter resonance tube 15 should be at least 0.6 times the length of the longer resonance tube 16. In the embodiment illustrated, based on the position of the damper vessel 17 as well as the resonator vessels 7 and 8 in the then available free space, the length of the resonance tube 15 is actually 560 mm, while the length of the resonance tube 16 is 720 mm. Thus, the shorter resonance tube 15 has a length which is 0.78 times the length of the longer resonance tube 16 and is thus within the above-stated limit.

The identity of functioning, that is, the desired identity of the pressure fluctuations in the two acoustic oscillating systems is re-established by tuning the oscillating systems to at least approximately the same natural frequency. Thus, the resonator vessel 7 coupled with the shorter resonance tube 15 is designed to have the greater volume—8 liters—while the resonator vessel 8 coupled to the longer resonance tube 16 is designed to have a smaller volume, that is 6.5 liters. Thus, the volume of the resonator vessel 7 coupled to the shorter resonance tube 15 is in fact 1.23 times the volume of the resonator vessel 8 coupled to the longer resonance tube 16. In order to ensure the desired identity of the amplitudes of oscillation, the cross section of the shorter resonance tube 15 is selected to be smaller than that of the longer resonance tube 16. The ratio of the favorable cross sections is at least approximately proportionate to the ratio of the lengths of the resonance tubes, that is, the shorter resonance tube 15 has a proportionately smaller cross section which, however, is at least 0.8 times the cross section of the longer resonance tube 16. An accurate adherence to the proportionality of the cross sections and the tube lengths is, in most cases, not feasible, because in many instances the tubes are made of cold drawn light metal or steel and the choice of diameters is not infinite. The adherence to an exact proportionality is, in any event, not indispensable; a satisfactory amplitude identity can be achieved if an available tube diameter is selected which is closest to the exact value of proportionality. For this reason the diameter of the longer resonance tube 16 is selected to be 52 mm, whereas the diameter of the shorter resonance tube 15 is selected to be 48 mm. This means that the diameter of the shorter resonance tube 15 is 0.92 times the diameter of the longer resonance tube 16; thus, the deviation of the diameters is within the above-discussed limits.

In case of sufficiently small (not more than 15–20%) tube length deviation, it is feasible to use, in extreme cases, tubes of identical diameters should this be particularly advantageous from the manufacturing point of view. Even in the latter case one can ensure, in a manner described before, the desired identity of the pressure amplitudes, namely a deviation of less than ±10–15% from the average. This, in turn, ensures an identical charging of the individual engine cylinders even if the resonance tubes have different lengths.

The cross section of the resonance tubes 15 and 16 need not be circular. Thus, in case of resonance tubes of non-circular cross section, the diameters of circles having an area which is identical to the respective cross-sectional area of the tubes are being related to one another.

It is further to be noted that the intake gas conduit system according to the invention may find application in other than six-cylinder in-line engines. Thus, six-cylinder, eight-cylinder or twelve-cylinder V-engines may use the system as well. In case of a twelve-cylinder V-engine, it is expedient to provide four acoustic oscillating systems, two for each cylinder row. It is to be understood that in such a case, it is not absolutely necessary that all four resonance tubes be of different lengths, since, in practice, the positioning may be identical for both cylinder rows and thus two resonance tubes will have the same length, that is, the resonance tubes form two groups according to their length.

Figure 3:
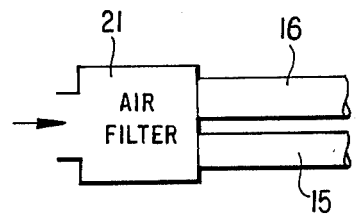
FIG. 3 is a schematic fragmentary illustration of a variant of FIG. 1.

The versatility of the practical embodiments of the system according to the invention is further enhanced by the fact that the damper vessel 17 need not be an independent structural unit; rather, as illustrated in FIG. 3, it is feasible to constitute such damper vessel of an element which is coupled to the air intake conduit system, but which has a different primary function, such as an air filter 21.

Figure 2:
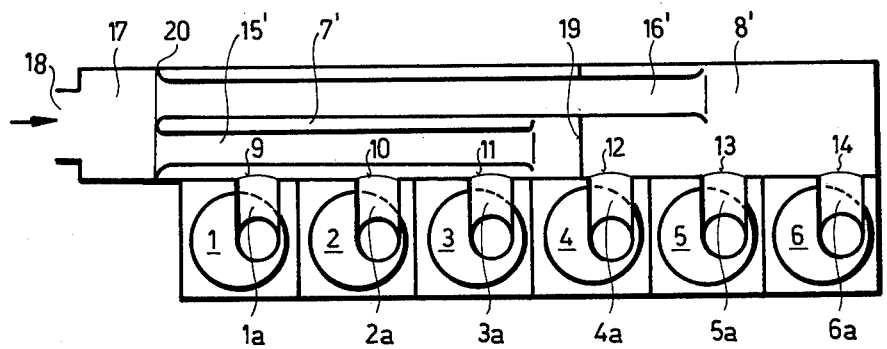
FIG. 2 is a schematic top plan view of another preferred embodiment of the invention associated with a six-cylinder in-line engine.

Turning now to the embodiment illustrated in FIG. 2, for the purpose of a compact positioning, the resonator vessels 7' and 8' have a common wall 19. Also, the resonator vessel 7' and the damper vessel 17 have a common wall 20. The resonance tubes 15' and 16' are, in their entirety, arranged within the inner space of the resonator vessels 7' and 8'. More particularly, the entire resonance tube 15' coupled to the resonator vessel 7' and a length portion of the resonance tube 16' coupled to the resonator vessel 8' are arranged in the resonator vessel 7', while the remaining length portion of the resonance tube 16' is received in the resonator vessel 8'. In this manner the intake gas conduit system forms a compact unit which may be accommodated in a relatively small space next to the engine. It is noted that in this embodiment too, the damper vessel may be constituted by an air filter or other device as described in FIG. 3 in connection with the embodiment in FIG. 1.

Numerous tests have shown that an appropriate identity of the oscillation characteristics of the several acoustic oscillating systems i.e. an identical charging of the individual engine cylinders could not be achieved if the claimed limits were not observed.

It is to be understood that the above description of the present invention is susceptible to various modifications, changes and adaptations, and the same are intended to be comprehended within the meaning and range of equivalents of the appended claims.

What is claimed is:

1. In a multi-space intake gas conduit system for introducing intake gases by resonance charging into a multi-cylinder internal combustion piston engine, including at least two separate resonator vessels each associated with a separate cylinder group formed of predetermined cylinders of the engine; each resonator vessel being coupled to intake openings of the cylinders forming the cylinder group associated with the respective resonator vessel; at least one resonance tube coupled to each resonator vessel; and at least one damper vessel interconnecting the resonance tubes; the resonator vessels and resonance tubes associated with separate cylinder groups forming separate acoustic oscillating system tuned to substantially the same natural frequencies for charging the cylinders; the improvement wherein the resonance tubes coupled to different resonator vessels form, according to their length, at least two significantly unlike dimensional groups; further wherein the nominal length of the shortest resonance tube is at least 0.6 times the nominal length of the longest resonance tube and the nominal diameter of a circle having an area identical to the cross-sectional area of said shortest resonance tube is smaller than, but at least 0.8 times, the nominal diameter of a circle having an area identical to the cross-sectional area of said longest resonance tube; and further wherein the nominal volume of the resonator vessel coupled to said shortest resonance tube is at the most 1.7 times the nominal volume of the resonator vessel coupled to said longest resonance tube, whereby the amplitude and the kinetic energy of oscillations of said separate acoustic oscillating systems are at least approximately equal and the oscillating masses of said separate acoustic oscillating systems are different for obtaining uniformity in the charging of each cylinder with intake air.

2. A multi-space intake gas conduit system as defined in claim 1, wherein said damping vessel is a component coupled to said system and having an additional function.

3. A multi-space intake gas conduit system as defined in claim 2, wherein said component is an air filter.

4. A multi-space intake gas conduit system as defined in claim 1, wherein two said resonator vessels have a common wall.

5. A multi-space intake gas conduit system as defined in claim 4, wherein one of said resonator vessels and said damping vessel have a common wall.

6. A multi-space intake gas conduit system as defined in claim 1, wherein said resonance tubes are arranged at least in part in the interior of at least one of said resonator vessels.

7. A multi-space intake gas conduit system as defined in claim 1, wherein the length of the shortest resonance tube is at the most 0.78 times the length of the longest resonance tube.

8. A multi-space intake gas conduit system as defined in claim 1, wherein the diameter of a circle having an area identical to the cross-sectional area of said shortest resonance tube is at the most 0.92 times the diameter of a circle having an area identical to the cross-sectional area of said longest resonance tube.

9. A multi-space intake gas conduit system as defined in claim 1, wherein the volume of the resonator vessel coupled to said shortest resonance tube is at least 1.23 times the volume of the resonator vessel coupled to said longest resonance tube.

10. A multi-space intake gas conduit system as defined in claim 1, wherein the nominal volume of the resonator vessel coupled to said shortest resonance tube is greater than the nominal volume of the resonator vessel coupled to said longest resonance tube.

11. In a multi-space intake gas conduit system for introducing intake gases by resonance charging into a multi-cylinder internal combustion piston engine, including at least two separate resonator vessels each associated with a separate cylinder group formed of predetermined cylinders of the engine; each resonator vessel being coupled to intake openings of the cylinders forming the cylinder group associated with the respective resonator vessel; at least one resonance tube coupled to each resonator vessel; and at least one damper vessel interconnecting the resonance tubes; the resonator vessels and resonance tubes associated with separate cylinder groups forming separate acoustic oscillating systems tuned to substantially the same natural frequencies for charging the cylinders; the improvement wherein the resonance tubes coupled to different resonator vessels form, according to their length, at least two significantly unlike dimensional groups; further wherein the nominal length of the shortest resonance tube is at least 0.6 times the nominal length of the longest resonance tube and the nominal diameter of a circle having an area identical to the cross-sectional area of said shortest resonance tube is at least 0.8 times the nominal diameter of a circle having an area identical to the cross-sectional area of said longest resonance tube; and further wherein the nominal volume of the resonator vessel coupled to said shortest resonance tube is larger than, but at the most 1.7 times, the nominal volume of the resonator vessel coupled to said longest resonance tube, whereby the amplitude and the kinetic energy of oscillations of said separate acoustic oscillating systems are at least approximately equal and the oscillating masses of said separate acoustic oscillating systems are different for obtaining uniformity in the charging of each cylinder with intake air.

* * * * *